United States Patent
Schneider et al.

(10) Patent No.: US 8,062,416 B2
(45) Date of Patent: Nov. 22, 2011

(54) PIGMENT RED 112 WITH ENHANCED DISPERSIBILITY

(75) Inventors: Lars Schneider, Liederbach (DE); Martin Reif, Frankfurt am Main (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 12/713,459

(22) Filed: Feb. 26, 2010

(65) Prior Publication Data

US 2010/0229760 A1    Sep. 16, 2010

(30) Foreign Application Priority Data

Mar. 11, 2009 (DE) .......................... 10 2009 012 685

(51) Int. Cl.
C09B 67/20 (2006.01)
C09B 67/04 (2006.01)
C09B 67/14 (2006.01)

(52) U.S. Cl. ........ 106/496; 106/31.8; 106/493; 524/190

(58) Field of Classification Search ................... 106/493, 106/496, 31.8; 524/190
See application file for complete search history.

(56) References Cited

U.S. PATENT DOCUMENTS

| | | | |
|---|---|---|---|
| 4,496,481 A * | 1/1985 | Wheeler | 534/579 |
| 5,086,168 A | 2/1992 | Rieper | |
| 5,151,129 A | 9/1992 | Morrison et al. | |
| 5,243,032 A | 9/1993 | Rieper | |
| 6,437,104 B1 | 8/2002 | Nickel et al. | |
| 6,469,147 B2 | 10/2002 | Nickel et al. | |
| 6,485,558 B1 | 11/2002 | Metz et al. | |
| 6,794,504 B2 | 9/2004 | Klopp et al. | |
| 7,135,266 B2 | 11/2006 | Baur et al. | |
| 7,309,389 B2 * | 12/2007 | Baur et al. | 106/31.48 |
| 7,419,541 B2 * | 9/2008 | Grimm et al. | 106/496 |
| 7,563,318 B1 * | 7/2009 | Faucher et al. | 106/496 |
| 7,819,969 B2 * | 10/2010 | Deroover | 106/496 |
| 2001/0029294 A1 | 10/2001 | Nickel et al. | |
| 2002/0058794 A1 | 5/2002 | Nickel et al. | |
| 2003/0083410 A1 | 5/2003 | Baur et al. | |
| 2003/0088091 A1 | 5/2003 | Klopp et al. | |
| 2004/0131507 A1 | 7/2004 | Saitmacher et al. | |
| 2006/0228640 A1 | 10/2006 | Baur et al. | |
| 2006/0276563 A1 | 12/2006 | Osterod et al. | |
| 2007/0213516 A1 | 9/2007 | Hoellein et al. | |

FOREIGN PATENT DOCUMENTS

| | | |
|---|---|---|
| DE | 1469782 | 5/1969 |
| EP | 0319452 | 6/1989 |
| EP | 0451094 | 10/1991 |
| EP | 1081195 | 3/2001 |
| EP | 1282666 | 10/2001 |
| EP | 1167460 | 1/2002 |
| GB | 1080115 | 8/1967 |
| GB | 1156835 | 7/1969 |
| JP | 9176514 | 7/1997 |
| WO | WO 01/59013 | 8/2001 |
| WO | WO 02/068540 | 9/2002 |
| WO | WO 2004/094540 | 11/2004 |
| WO | WO 2005/105927 | 11/2005 |

OTHER PUBLICATIONS

Derwent-Acc-No. 2009-R33378, abstract of Chinese Patent Specification No. CN 101565557A (Oct. 2009).*
EPO Search Report for EP 10001556, mailed Jul. 27, 2010.
English Abstract for JP 9176514, Jul. 8, 1997.

\* cited by examiner

*Primary Examiner* — Anthony Green
(74) *Attorney, Agent, or Firm* — Anthony A. Bisulca

(57) ABSTRACT

The invention provides a process for preparing uncoated, readily dispersible C.I. Pigment Red 112 by azo coupling in a microreactor, which comprises precipitating the coupling component in an upstream microreactor and coupling the precipitated coupling component in finely divided form to the diazo component in a microreactor.

The C.I. Pigment Red 112 of the invention features low dispersion harshness in alkyd resin varnish, and a PCB content of below 25 ppm.

11 Claims, No Drawings

PIGMENT RED 112 WITH ENHANCED DISPERSIBILITY

In order to incorporate a pigment as color-imparting component into a paint, a printing ink, a synthetic resin or a varnish, it must be very finely divided by dispersion in the respective application medium, a process which often entails much time and energy. In the course of this mechanical operation, agglomerates are broken apart and the surface of the pigment is wetted by the binder system. Only then is the pigment able fully to develop its performance properties. Manufacturers of colored products prefer those pigments for which this dispersion effort is extremely low.

There are a whole range of different possibilities described as to how to prepare readily dispersible pigments. Dispersibility can be improved by surface modification, surface treatment, surface coating, or the presence of particular inert auxiliaries or reagents. Another possibility is the production of flushing pastes, which are produced from an aqueous pigment presscake by displacing the water with binders such as alkyd resins, cellulose acetobutyrate, mineral oil or any organic, water-immiscible solvents. A further possibility is the furnishing of prepared products which comprise a predispersed pigment and are therefore much easier to incorporate into an application medium than is the dry pigment powder on which the product in question is based.

DE-A-14 69 782 describes how treating the pigments with long-chain aliphatic amines makes them easy to disperse. For that purpose the amine in the form of its ammonium salt is mixed with the moist pigment and liberated in the form of the free amine by a modification to the pH.

EP-A-0 451 094 describes how a similar effect is achieved through the targeted addition of azo dyes. In that case the coupling component is actually precipitated in the presence of the dye. The dye is present throughout the synthesis of the pigment and is likewise part of the formulation produced.

JP 09176514 describes how dispersibility is improved by giving pigments a fluorine aftertreatment.

EP 1 081 195 A2 describes how pigments are stabilized in the state of fine division that obtains immediately post-synthesis by means of enveloping the surface with polymer layers.

WO 2004/094540 describes how the energy input needed for sufficient dispersion of the pigment in the application medium can be reduced by around 20% by means of surface coating. This is done by jacketing the pigment particles with (meth)acrylate copolymers containing amine groups.

All of the abovementioned possibilities for enhancing dispersibility are tied up with additional costs for materials, additional mixing operations or further worksteps in addition to the pigment synthesis itself. The additional additives used may, furthermore, undesirably alter the performance properties apart from the enhanced dispersibility. Depending on the chemicals legislation, the resultant formulation may be subject to mandatory labeling. Flushing pastes and prepared products, moreover, are less universal in their possible uses, and are difficult to standardize. Furthermore, additional costs arise for measures to counter bacterial and fungal infestation.

C.I. Pigment Red 112 is a Naphthol AS pigment which is widely used in industry. Its coloristic properties mean that it has found broad use in printing inks, varnishes, and paints.

Finely divided incorporation of an untreated C.I. Pigment Red 112 into a binder system can be accomplished only with a high dispersion effort. If the aim is to save energy, then greater amounts of dispersing assistant are needed. These greater amounts, however, often lead to a correspondingly great influence on other properties, mostly unwanted.

It was an object of the invention, therefore, to provide readily dispersible C.I. Pigment Red 112 without the need for use of auxiliaries or additives or for surface modification.

It has been found that the object of the invention can be achieved, surprisingly, through a new pigment synthesis by means of microreaction technology, as described in WO 2005/105927, for example. Differing therefrom, however, the coupling component is not used in the form of its solution, but is instead precipitated in an upstream microreactor.

The invention provides a process for preparing uncoated, readily dispersible C.I. Pigment Red 112 by azo coupling in a microreactor, which comprises precipitating the coupling component in an upstream microreactor and coupling the precipitated coupling component in finely divided form to the diazo component in a microreactor.

The term "uncoated" refers to a pigment whose surface is free from additives or auxiliaries that cannot be washed off, and more particularly is free from polymer layers, such as the (meth)acrylate polymers referred to in the prior art, for example.

The term "readily dispersible" refers to a pigment having a dispersion harshness of less than 45, as defined below.

The coupling component used for preparing C.I. Pigment Red 112 is N-(2-methylphenyl)-2-hydroxy-3-naphthoamide. The amine used to prepare the diazo component is 2,4,5-trichloroaniline.

In the process of the invention at least the precipitation of the coupling component and the azo coupling are carried out in a microreactor. Also possible is a combination of three reactors for precipitating the coupling component, diazotizing the amine to the diazonium salt, and reacting the two components to give the azo pigment. The diazotization may take place under customary conditions, i.e., at temperatures between 0 and 15° C. and at a pH of between −1 and 1. The precipitated coupling component is reacted in finely divided form with the diazo component. In one preferred version of the process, therefore, the coupling component, following its precipitation, is subjected to wet grinding, in a ball mill or equivalent assembly, for example, until a particle size of around 1 micrometer or less has been reached.

Microreactors which can be used are the devices and apparatus described in WO2005/105927 A1.

A microreactor is constructed from a plurality of laminae which are stacked on one another and bonded to one another and whose surfaces bear micromechanically created structures which interact to form reaction spaces for chemical reactions. The system contains at least one continuous channel which communicates with the inlet and the outlet.

The flow rates of the streams of material are limited by the apparatus, as for example by the pressures which result in dependence on the geometry of the microreactor. It is desirable for the microreactor reaction to go to completion, but it is also possible to adjoin a delay zone to create a delay time where necessary. The flow rates are advantageously between 0.05 ml/min and 5 l/min, preferably between 0.05 and 500 ml/min, more preferably between 0.05 and 250 ml/min, and more particularly between 0.1 and 100 ml/min.

The microreaction system is operated continuously, and the quantities of fluid which are mixed with each other are in the microliter (µl) to milliliter (ml) range. Critical to the production of solids in this microreaction system are the dimensions of the microstructured regions within the reactor. The selected dimensions must be large enough for particulate solids to pass through without problems, so that the channels do not become clogged. The smallest clear width of the microstructures ought to be about ten times larger than the diameter of the largest particulate solids. Furthermore, appropriate geometric design must be carried out to ensure that there are no dead water zones, such as dead ends or sharp corners, for example, where particulate solids might settle. Preference is therefore given to continuous paths with rounded corners. The structures must be small enough to exploit the intrinsic advantages of the microreaction technology, namely precise temperature control, laminar flow, diffusive mixing, and low internal reaction volume.

The clear width of the solution- or suspension-ducting channels is advantageously 5 to 10 000 μm, preferably 5 to 2000 μm, more preferably 10 to 800 μm, more particularly 20 to 700 μm.

The clear width of the heat exchanger channels is guided primarily by the clear width of the liquid- or suspension-ducting channels and is advantageously less than or equal to 10 000 μm, preferably less than or equal to 2000 μm, more particularly less than or equal to 800 μm. The lower limit for the clear width of the heat exchanger channels is not critical and is at most constrained by the pressure increase of the heat exchanger fluid to be pumped and by the necessity for optimum supply or removal of heat.

The dimensions of the microreaction system used are as follows:
heat exchanger structures: channel width about 600 μm, channel height: about 250 μm;
mixer and delay zone: channel width about 600 μm, channel height about 500 μm.

The microreactor is preferably charged from above with all heat exchanger fluids and reactants. The product and the heat exchanger fluids are preferably likewise removed from above. The supply of third and fourth liquids involved in the reaction (e.g., buffer solutions), where necessary, is realized via a T-junction located directly upstream of the reactor—in other words, one reactant at a time can be mixed in advance with the buffer solution. The requisite concentrations and flows are monitored preferably via precision piston pumps and a computer-controlled regulation system. The reaction temperature is monitored via integrated sensors and is monitored and controlled by means of the regulation system and a thermostat/cryostat.

The preparation of mixtures of input materials may also take place beforehand, in micromixers or in upstream mixing zones. It is also possible for input materials to be metered in downstream mixing zones or in downstream micromixers or microreactors.

The system used here is manufactured from stainless steel; other materials, such as glass, ceramic, silicon, plastics or other metals, for example, can similarly be used.

The pigment synthesis of the invention proceeds preferably as follows: first of all the coupling component, N-(2-methylphenyl)-2-hydroxy-3-naphthoamide, is dissolved, preferably with sodium hydroxide solution, preferably in aqueous solution or in mixtures of water and solvents, or in organic solvents, such as, for example, alcohols having 1 to 10 carbon atoms, such as methanol, ethanol, n-propanol, isopropanol, butanols, such as n-butanol, sec-butanol, tert-butanol, pentanols, such as n-pentanol, 2-methyl-2-butanol, hexanols, such as 2-methyl-2-pentanol, 3-methyl-3-pentanol, 2-methyl-2-hexanol, 3-ethyl-3-pentanol, octanols, such as 2,4,4-trimethyl-2-pentanol, cyclohexanol; or glycols, such as ethylene glycol, diethylene glycol, propylene glycol, dipropylene glycol, or glycerol; polyglycols, such as polyethylene glycols or polypropylene glycols; ethers, such as methyl isobutyl ether, tetrahydrofuran or dimethoxyethane; glycol ethers, such as monomethyl or monoethyl ethers of ethylene glycol or propylene glycol, diethylene glycol monomethyl ether, diethylene glycol monoethyl ether, butyl glycols or methoxybutanol; ketones, such as acetone, diethyl ketone, methyl isobutyl ketone, methyl ethyl ketone or cyclohexanone; aliphatic acid amides, such as formamide, dimethylformamide, N-methylacetamide or N,N-dimethylacetamide; urea derivatives, such as tetramethylurea; or cyclic carboxamides, such as N-methylpyrrolidone, valerolactam or caprolactam; esters, such as carboxylic acid $C_1$-$C_6$ alkyl esters, such as butyl formate, ethyl acetate or propyl propionate; or carboxylic acid $C_1$-$C_6$ glycol esters; or glycol ether acetates, such as 1-methoxy-2-propyl acetate; or phthalic or benzoic acid $C_1$-$C_6$ alkyl esters, such as ethyl benzoate; cyclic esters, such as caprolactone; nitriles, such as acetonitrile or benzonitrile; aliphatic or aromatic hydrocarbons, such as cyclohexane or benzene; or alkyl-, alkoxy-, nitro- or halo-substituted benzene, such as toluene, xylenes, ethylbenzene, anisole, nitrobenzene, chlorobenzene, o-dichlorobenzene, 1,2,4-trichlorobenzene or bromobenzene; or other substituted aromatics, such as benzoic acid or phenol; aromatic heterocycles, such as pyridine, morpholine, picoline or quinoline; and also hexamethylphosphoramide, 1,3-dimethyl-2-imidazolidinone, dimethyl sulfoxide, and sulfolane. Said solvents may also be used as mixtures. It is preferred to use water-miscible solvents.

The coupling component is subsequently precipitated by introducing the coupler solution and the precipitant solution via two reactant ports of the microreactor, and mixing these two solutions in the reactor chamber. The precipitant solution is preferably an aqueous solution of an organic or inorganic acid, such as acetic acid, hydrochloric acid or sulfuric acid, for example, or a mixture of different acids. Precipitation takes place preferably at temperatures between 0 and 20° C., more particularly between 5 and 10° C.

The azo coupling reaction takes place preferably in aqueous solution or suspension, though it is also possible to use organic solvents, as recited above, where appropriate in a mixture with water. The stated solvents may also be used as mixtures. It is preferred to use water-miscible solvents. Azo coupling takes place preferably at temperatures between 20 and 40° C., more particularly between 25 and 35° C.

Although not necessary, it is possible in the process of the invention as well to use the auxiliaries that are used in the conventional processes, such as, for example, surfactants, pigmentary and nonpigmentary dispersants, fillers, standardizers, resins, waxes, defoamers, antidust agents, extenders, shading colorants, preservatives, drying retarders, rheology control additives, wetting agents, antioxidants, UV absorbers, light stabilizers, or a combination thereof.

The auxiliaries may be added at any desired point in time before, during or after the reaction in the microreactor, all at once or in two or more portions. The auxiliaries may be added, for example, directly to the solutions or suspensions of the reactants, or else during the reaction, in liquid, dissolved or suspended form. The total amount of auxiliaries added may be 0% to 40%, preferably 1% to 30%, more preferably 2.5% to 25%, by weight, based on C.I. Pigment Red 112.

The inventively prepared C.I. Pigment Red 112 is notable for a particularly low dispersion hardness attained by none of the synthesis processes known up until now.

The invention accordingly also provides an uncoated C.I. Pigment Red 112 having a dispersion harshness in alkyd resin varnish of less than or equal to 45, preferably less than or equal to 40, more preferably less than or equal to 35, more particularly less than or equal to 25.

Additionally provided by the invention is an uncoated C.I. Pigment Red 112 prepared by the process of the invention.

Dispersion harshness is a measure of the dispersibility of a pigment in a particular application medium. For example, EP1282666 B1 describes the dispersion harshness of pigments in LDPE plastics.

In the case of C.I. Pigment Red 112, the application medium is preferably a paint or a varnish, and so the dispersion harshness is determined advantageously in an alkyd resin varnish.

Alkyd resins are synthetic hydrophobic polymers formed by esterification of polyhydric alcohols with polyprotic acids with addition of oils or fatty acids. A polyhydric alcohol used is, in particular, glycerol, pentaerythritol or trimethylolpropane; a polyprotic acid used is, in particular, a phthalic acid, usually in the form of phthalic anhydride, also isophthalic acid.

Oils are, for example, linseed oil, fish oil, soybean oil, cottonseed oil, sunflower oil, tall oil, which may comprise diunsaturated and polyunsaturated fatty acids, such as 9,12,15-linolenic acid, for example.

Alkyd resins are distinguished by the level ("length") of the oil content or fatty acid content:
below 40% oil: short-oil; between 40% and 60% oil: medium-oil; above 60% oil: long-oil.

Oils which include a sufficient amount of diunsaturated or polyunsaturated fatty acids are referred to as drying oils, the corresponding alkyd resins as drying or else as air-drying alkyd resins.

Alkyd resins are available commercially, usually in dissolved form. Suitable solvents include the following: paint and varnish makers' spirit, xylene, ethylbenzene, ethyl acetate, butyl acetate, acetone, methyl ethyl ketone (MEK), methyl isobutyl ketone (MIBK), methoxypropanol, methoxypropyl acetate, methanol, ethanol, isopropanol, isomeric butanols, and mixtures thereof.

Pigmented alkyd resin varnishes generally have a pigment content of 5% to 35% by weight.

For the determination of the dispersion harshness in the pigmented (P.R. 112) alkyd resin varnish, in accordance with the invention, a comparison is made of the relative color strengths of alkyd resin varnish grinds at 6 minutes and at ninety minutes of dispersing time, in accordance with the following formula (FS=relative color strength):

$$\text{Dispersion harshness} = \left(\frac{FS(90 \text{ min})}{FS(6 \text{ min})} - 1\right) \cdot 100$$

The smaller the value of the dispersion harshness, the more readily dispersible the pigment.

In this test the pigment samples are admixed with a defined amount of grinding varnish (air-drying, long-oil alkyd resin varnish) and dispersed in a dispersing assembly, such as a paint shaker, for example, for 6 minutes and for 90 minutes, under otherwise identical conditions.

The grinding varnish is made up for example as follows: about 15% by weight of C.I. Pigment Red 112, about 85% by weight of alkyd resin solution.

The alkyd resin solution is composed for example of:
45.4% by weight solution (70% by weight in paint and varnish makers' spirit) of a long-oil, air-drying alkyd resin based on soybean oil/phthalic anhydride (62% by weight oil, 27% by weight phthalic anhydride, remainder primarily pentaerythritol and/or glycerol);
2.6% by weight siccative (Ca octoate), 10% strength by weight in paint and varnish makers' spirit, e.g., Octa-Soligen Ca;
2.8% by weight soya lecithin;
49.2% by weight paint and varnish makers' spirit.

Long-oil, air-drying alkyd resins are available commercially, as for example under the trade name Vialkyd® AS 673 h/70% White Spirit (Cytec).

Subsequently the dispersed grinding varnishes are diluted with further alkyd resin varnish and also with a white paint and homogenized, and this system is drawn down onto a test chart and dried. The FS is determined colorimetrically in accordance with the CIELAB formula.

The values of dispersion harshness in accordance with the invention relate preferably to determination in an air-drying, long-oil alkyd resin, more particularly in the grinding varnish composition described above.

The pigment prepared in accordance with the invention is notable additionally for a very low PCB content of less than 25 ppm, preferably less than 10 ppm.

The pigment prepared in accordance with the invention is also notable for a very low residual coupler content of less than 1.0% by weight, preferably less than 0.70% by weight.

The P.R. 112 of the invention can be employed in principle to pigment all high molecular mass organic materials of natural or synthetic origin, such as plastics, resins, varnishes, especially metallic varnishes, paints, electrophotographic toners and developers, electrical materials, color filters, and also liquid inks and printing inks. Particularly preferred are paints, varnishes, and printing inks.

In the examples below, per cent means per cent by weight, unless indicated otherwise, and parts mean parts by weight.

Test Systems:

The dispersibility is assessed on the basis of the color strength in an air-drying alkyd resin system. For this purpose, 4.5 g of pigment are weighed out into a 150 ml plastic beaker together with 25.5 g of grinding varnish, consisting of 45.38% Vialkyd® AS 673 h/70% strength by weight in White Spirit, 2.58% Octa-Soligen® Ca, 10% strength by weight in paint and varnish makers' spirit [P&VMS], 2.82% soya lecithin and 49.22% P&VMS 145/200, 85 g of glass beads (3 mm $\phi$) are added, and the system is then dispersed with a dispersing assembly, a paint shaker, for example, for 6 minutes in one case and for ninety minutes in one case. After dispersion has taken place, 60 g of siccativated let down mixture (LA4 Let Down Mixture 54%, Esser-Lacke), consisting of 77.14% Vialkyd AS 673 h/70% WS, 0.90% Bykanol-N®, 2.80% Octa-Soligen Dryer 173 and 19.16% P&VMS 145/200, are weighed in and the mixture is homogenized.

The varnishes thus produced are each weighed out into a plastic beaker together with white paint (e.g. LA4 White Lacquer 27%, Esser-Lacke) (approximately 155 seconds efflux viscosity, DIN cup, 4 mm nozzle), consisting of 27.00% titanium dioxide, 49.97% Vialkyd AS 673 h/70% WS, 2.70% Bentone® 34, 10% in P&VMS, 0.70% Octa-Soligen Ca 10%, 5.12% P&VMS 180/210, 11.53% P&VMS 145/200, 1.48% Bykanol-N, 1.50% Octa-Soligen Dryer 173, in a ratio of 1:3.7 (siccativated let down mixture: white paint), and this system is homogenized in a shaker machine.

Sample and comparative are drawn down alongside one another using a film-drawing apparatus (e.g., Vertrieb Erichsen GmbH & Co. KG) onto a test chart, (e.g., Chromolux® 200 from Zanders Feinpapiere AG). The charts are dried at 60° C. for sixty minutes.

Evaluation takes place colorimetrically in accordance with the CIELAB formula.

The polychlorinated biphenyls (PCB) content is determined as described in the article by N. Sistovaris, U. Donges, B. Dudeck; J. High Res. Chrom. 1990(13), 547ff.

The residual coupler content of the pigment is determined by HPLC on a system with a quaternary gradient pump, variable wavelength detector, column oven, with a flow rate of 1.5 ml/min at an oven temperature of 40° C., with an observation wavelength of 240 nm, against methyl 4-nitrobenzoate as internal standard. The column used may be, for example, a Phenomenex® Luna 5 μm phenyl-hexyl, 150×4.6 mm. 0.05 g of the sample are admixed with 5 ml of internal standard, consisting of the aforementioned compound in solution in 100 ml of acetonitrile, and treated with ultrasound for 5 minutes, then filtered and applied in an amount of 0.2 microliter to the column.

EXAMPLE 1

1.1) Preparation of the Diazonium Salt Solution of 2,4,5-trichloroaniline:

250 parts of water are introduced and 40.3 parts of 2,4,5-trichloroaniline are first stirred in homogeneously at room temperature and admixed with 193 parts by volume of 31% strength hydrochloric acid. Cooling then takes place to 0° C. with ice. Diazotization is carried out with 29 parts by volume of 40% strength sodium nitrite solution. The resulting diazonium salt solution is admixed with a clarifying aid and then filtered into a receiver vessel. The excess nitrite is removed by addition of amidosulfonic acid, and the temperature is held at 10° C. by external cooling.

1.2) Preparation of a Solution of Coupling Component (Naphthol):

190 parts of water and 28 parts by volume of 33% strength sodium hydroxide solution, and also 1 part of an alkylsulfonate, are introduced at room temperature, and 60 parts of N-(2-methylphenyl)-2-hydroxy-3-naphthoamide are added. The mixture is stirred until a clear solution is obtained (=solution 1). In a second stock vessel, a mixture of 176 parts of water, 2 parts of an alkylsulfonate and 32 parts by volume of 80% strength acetic acid is prepared and is adjusted to room temperature (=solution 2).

1.3) Precipitation of the Coupling Component in a Microreactor:

The coupler solution (solution 1) and the dilute acid (solution 2) are pumped at a flow rate of 6 ml/min into the respective reactant ports of the microreactor (type: Cytos from CPC-Systems, Frankfurt). Via the regulated heat exchanger circuit of the microreactor, a precipitation temperature of 5° C. is set and maintained. The resulting precipitate, with a pH of 5, is collected in a receiver vessel and held at a temperature of 5° C. It is thus available for the subsequent azo coupling.

1.4) Provision of Dilute Sodium Hydroxide Solution for Regulating the pH During Azo Coupling:

150 parts of a water/ice mixture are mixed with 100 parts by volume of 33% strength sodium hydroxide solution and held at 5° C. by means of external cooling.

1.5) Azo Coupling in a Microreactor:

The diazonium salt solution and the coupler suspension are pumped at a flow rate of 8 ml/min into the respective reactant ports of the microreactor (type: Cytos from CPC-Systems, Frankfurt). In order to ensure the required pH of approximately 4.5 for azo coupling, the dilute sodium hydroxide solution described in 1.4) is metered into the coupler precipitate a short way upstream of the reactor inlet. The sodium hydroxide solution is likewise conveyed into the reactant feedline of the microreactor by means of a calibrated piston pump via a T-junction, at a flow rate of 6 ml/min. Attached to the heat exchanger circuit of the microreactor is a thermostat, which sets the desired reaction temperature of 20° C. to 40° C. The coupled pigment suspension is collected in a receiver vessel, drawn off under suction, washed salt-free, and dried.

The dispersion harshness is 21, the residual coupler content is 0.56%, and the polychlorinated biphenyls content is 6 ppm.

EXAMPLE 2

Synthesis takes place as described in example 1, with step 1.3) being followed by the grinding of the precipitated coupler using a Dispax mill.

The dispersion harshness is 25, the residual coupler content is 0.69%, and the polychlorinated biphenyls content is 3 ppm.

COMPARATIVE EXAMPLE 1

BASED ON EP 0 319 452 A2, EXAMPLE 16

40.3 parts of finely crystalline 2,4,5-trichloroaniline are stirred overnight in a mixture of 200 parts of water, 0.5 parts of an alkylsulfonate and 200 parts by volume of 30% strength hydrochloric acid. Following addition of ice to the resulting suspension of the hydrochloride, diazotization is carried out by rapid introduction of 29 parts by volume of 40% strength sodium nitrite solution, followed by an hour of stirring. Subsequently the nitrite excess is destroyed with amidosulfonic acid and the diazonium salt solution is clarified.

In the coupling vessel, 60 parts of N-(2-methylphenyl)-2-hydroxy-3-naphthoamide are dissolved at 85° C. in 200 parts of water to which 28 parts by volume of 33% strength sodium hydroxide solution have been added. Following the addition of one part of the sodium salt of an alkylsulfonic acid to the clear solution, 30 parts by volume of glacial acetic acid are added at 5 to 10° C. Azo coupling takes place at 40 to 50° C. by running the nitrite-free diazonium salt solution into the suspension with the coupling component over the course of 2 to 3 hours. This is followed by stirring at 40 to 50° C. until reaction is complete, at which point the pigment is drawn off under suction, washed salt-free with water, and dried. The dispersion harshness is 52, the residual coupler content 3.80%.

COMPARATIVE EXAMPLE 2

BASED ON WO 90/15844, EXAMPLE 4

40 parts of 2,4,5-trichloroaniline are stirred overnight in a mixture of 200 parts of water, 200 parts by volume of 30% strength hydrochloric acid and 0.5 part of a secondary alkanesulfonate. Following addition of ice, diazotization is carried out rapidly with 29 parts by volume of a 40% strength aqueous sodium nitrite solution, followed by stirring with nitrite excess for 1 hour. The nitrite excess is then destroyed with amidosulfonic acid. The clarified diazonium salt solution is admixed with 5 parts of methacrylamide.

In the coupling vessel, 59.6 parts of N-(2-methylphenyl)-2-hydroxy-3-naphthoamide are dissolved in a mixture of 400 parts of water and 28 parts by volume of 33% strength sodium hydroxide solution at 80 to 85° C. 15 parts by volume of a 10% strength solution of the alkanesulfonate used before are added, followed by cooling to 5 to 10° C. with ice and then addition of 25 parts by volume of glacial acetic acid, to precipitate the coupling component in finely divided form. Azo coupling takes place at 15 to 25° C. by running of the nitrite-free diazonium salt solution into the suspension with the coupling component over the course of 2 hours. In this procedure the pH is held at 4 to 4.5 by dropwise addition of 10% strength sodium hydroxide solution. Following completion of coupling and customary workup, the pigment is obtained with a dispersion harshness of 50; the residual coupler content is 2.97% and the polychlorinated biphenyls content is 20 ppm.

COMPARATIVE EXAMPLE 3

IN LINE WITH WO2005/105927 A1

The coupler solution prepared in section 1.2) of example 1 is supplied for azo coupling, without precipitation, as described in section 1.5) of example 1. The constant pH of 5 that is needed for coupling is achieved through regulated metered addition of the dilute sodium hydroxide solution described in section 1.4) of example 1. Following solvent washing and membrane purification in the same way as in WO2005/105927 A1, example 1, the pigment is obtained with a dispersion harshness of 46; the residual coupler content is 1.36% and the polychlorinated biphenyls content is 11 ppm.

What is claimed is:

1. An uncoated C.I. Pigment Red 112 having a dispersion harshness in alkyd resin varnish of less than or equal to 45.

2. A C.I. Pigment Red 112 as claimed in claim 1, having a dispersion harshness in alkyd resin varnish of less than or equal to 40.

3. A C.I. Pigment Red 112 as claimed in claim 1, having a dispersion harshness in alkyd resin varnish of less than or equal to 35.

4. A C.I. Pigment Red 112 as claimed in claim 1, having a dispersion harshness in alkyd resin varnish of less than or equal to 25.

5. A C.I. Pigment Red 112 as claimed in claim 1, having a PCB content of less than 25 ppm.

6. A C.I. Pigment Red 112 as claimed in claim 1, having a PCB content of less than 10 ppm.

7. A C.I. Pigment Red 112 as claimed in claim 1, having a residual coupler content of less than 1.0% by weight.

8. A C.I. Pigment Red 112 as claimed in claim 1, having a residual coupler content of less than 0.70% by weight.

9. A pigmented high molecular mass organic material of natural or synthetic origin pigmented by the C.I. Pigment Red 112 as claimed in claim 1.

10. The pigmented high molecular mass organic material of natural or synthetic origin as claimed in claim 9, wherein the high molecular mass organic material of natural or synthetic origin is a pigment paint varnish or printing ink.

11. An uncoated C.I. Pigment Red 112 having a dispersion hardness in alkyd resin varnish of less than or equal to 45 made by a process comprising the steps of precipitating the coupling component in an upstream microreactor and coupling the precipitated coupling component in finely divided form to the diazo component in a microreactor.

* * * * *